No. 756,967. PATENTED APR. 12, 1904.
G. KELLER.
HOOF AND SHOE EXPANDER.
APPLICATION FILED FEB. 11, 1903.
NO MODEL.

George Keller, Inventor;

Witnesses

No. 756,967.

Patented April 12, 1904.

UNITED STATES PATENT OFFICE.

GEORGE KELLER, OF GILMAN, ILLINOIS.

HOOF AND SHOE EXPANDER.

SPECIFICATION forming part of Letters Patent No. 756,967, dated April 12, 1904.

Application filed February 11, 1903. Serial No. 142,839. (No model.)

*To all whom it may concern:*

Be it known that I, GEORGE KELLER, a citizen of the United States, residing at Gilman, in the county of Iroquois and State of Illinois, have invented a new and useful Hoof and Shoe Expander, of which the following is a specification.

This invention relates to implements employed for treating the hoofs of horses to remedy or prevent the contraction of the hoofs or to prevent or cure what is known as "hoof-binding," and has for its object to produce a simply-constructed and easily operated and applied implement which may be applied directly to the hoof or to the shoe before or after it is attached to the hoof.

The invention consists in certain novel features of construction, as hereinafter shown and described, and specified in the claims.

Figure 1:
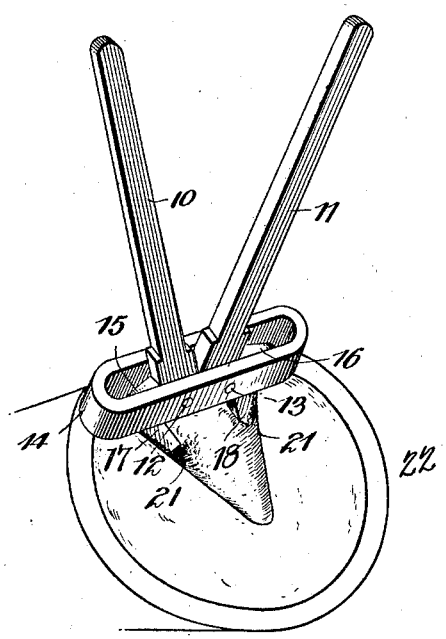
Figure 2:
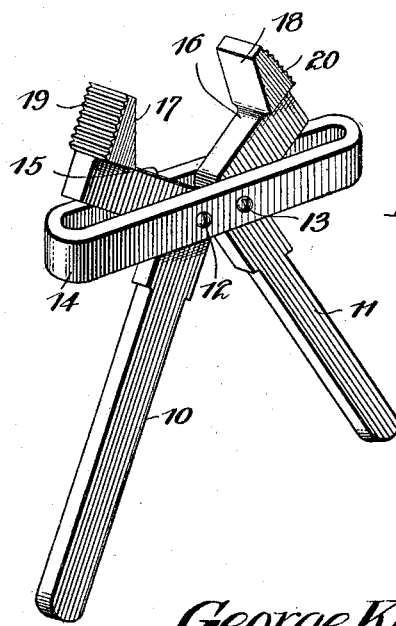

In the drawings illustrative of the invention, in which corresponding parts are denoted by like designating characters, Figure 1 is a perspective view of the implement applied. Fig. 2 is a perspective view of the implement detached and reversed in position.

The improved implement consists of two oppositely-arranged operating-levers pivotally mounted in a transverse member or yoke-frame 14, as shown at 12 13, and adapted to move in a plane parallel therewith, the yoke-frame embracing the levers on both sides and connected at its ends. The levers consist of handle members 10 11, from the upper ends of which extend transverse members 15 16, said last-named members being disposed within the yoke-frame. From the terminals of the transverse members 15 16 extend hoof-engaging members 17 18, which are disposed in a plane parallel with the handle members and are provided with oppositely-disposed serrated outer faces 19 20, said hoof-engaging members being made wider than the other members to provide an increased gripping-surface and offset outwardly from the pivotal points. The transverse intermediate portions 15 16 and the hoof-engaging portions 17 18 are made short in comparison with the handle members 10 11, so that the requisite leverage is obtained. By this simple arrangement an implement is produced which may be applied between the adjacent walls of the "frog" portions 21 of the hoof 22, as shown in Fig. 1, and a strong expanding force exerted to distend the parts and effectually prevent the contraction or binding of the hoofs.

The implement may be used upon the hoof either before or after the shoe is set in place, as the action is directly upon the hoof between the frogs, and the presence of the shoe does not interfere with its operation. By this means the hoofs may be easily maintained in proper shape and any defects in the shape or tendency thereof to grow in abnormal directions counteracted and prevented, abnormal growth being also remedied.

It will be noted that the serrated hoof-engaging surfaces 19 20 are offset and formed at reversed angles to the handle-lever portions 10 11, so that when applied, as shown in Fig. 1, they conform to the angular sides of the frog portion 21, and thus bring the whole of the operative surfaces to bear, thereby not only increasing the grip and force of the implement, but likewise distributing the strains over a greater area and decreasing the tendency to injure the hoofs, the transverse connecting portions 15 16 being adapted for alinement when the hoof-engaging portions are fully extended.

Having thus described the invention, what I claim is—

1. A hoof-expander having a transverse member, and a plurality of pivotal members mounted on the transverse member and having handle portions, offset hoof-engaging portions, and transverse connecting portions adapted for alinement when the hoof-engaging portions are fully extended.

2. A hoof-expander having a transverse slotted member, and a plurality of operating members pivoted in the slot, having handle portions, offset hoof-engaging portions, and intermediate transverse connecting portions adapted for alinement in the plane of the transverse member when the hoof-engaging portions are extended.

3. A hoof-expander comprising reversely-operating lever members each consisting of a handle-section and a serrated expansion-section disposed in a common plane and connected by a lateral section, a longitudinally-slotted frame embracing the opposite sides of said levers, and coupling-pins movably connecting said levers to said frame, substantially as described.

4. A hoof-expander consisting of a longitudinally-slotted frame, operating-levers pivotally mounted in said frame, and extending from one side thereof, said levers extending laterally in opposite directions within the slot of said frame, and having extensions projecting therefrom and provided with opposite serrated faces, substantially as described.

In testimony that I claim the foregoing as my own I have hereto affixed my signature in the presence of two witnesses.

GEORGE KELLER.

Witnesses:
J. W. KUTTRUFF,
R. G. KELLER.